(12) United States Patent
Paquin et al.

(10) Patent No.: US 9,043,891 B2
(45) Date of Patent: May 26, 2015

(54) PRESERVING PRIVACY WITH DIGITAL IDENTITIES

(75) Inventors: Christian Paquin, Redmond, WA (US); Gregory R. Thompson, Seattle, WA (US)

(73) Assignee: Microsoft Technology Licensiing, LLC, Redmond, WA (US)

( * ) Notice: Subject to any disclaimer, the term of this patent is extended or adjusted under 35 U.S.C. 154(b) by 828 days.

(21) Appl. No.: 12/708,529

(22) Filed: Feb. 18, 2010

(65) Prior Publication Data

US 2011/0202991 A1    Aug. 18, 2011

(51) Int. Cl.
G06F 7/04 (2006.01)
H04L 9/32 (2006.01)
H04L 29/06 (2006.01)
G06F 21/62 (2013.01)

(52) U.S. Cl.
CPC .......... *H04L 9/3213* (2013.01); *H04L 2209/04* (2013.01); *H04L 63/0807* (2013.01); *G06F 21/6245* (2013.01); *H04L 63/0853* (2013.01); *H04L 2209/42* (2013.01)

(58) Field of Classification Search
CPC .............. H04L 9/3213; H04L 63/0807; H04L 2209/42; H04L 63/0853; H04L 2209/04; G06F 21/6245
USPC ......................................................... 726/5, 9
See application file for complete search history.

(56) References Cited

U.S. PATENT DOCUMENTS

| | | | |
|---|---|---|---|
| 2007/0204167 A1 | 8/2007 | Beker et al. | |
| 2007/0204325 A1 | 8/2007 | Cameron et al. | |
| 2008/0229384 A1 | 9/2008 | Hodgkinson et al. | |
| 2009/0205032 A1 | 8/2009 | Hinton et al. | |
| 2009/0271856 A1* | 10/2009 | Doman et al. | 726/9 |
| 2010/0318782 A1* | 12/2010 | Auradkar et al. | 713/150 |
| 2010/0325441 A1* | 12/2010 | Laurie et al. | 713/185 |

FOREIGN PATENT DOCUMENTS

WO    2006043262 A2    4/2006

OTHER PUBLICATIONS

Hansen, et al., "Privacy and Identity Management", Retrieved at <<http://www.cs.ru.nl/~jhh/pub/secsem/hansen2008privacy-and-idm.pdf>> Mar.-Apr. 2008, p. 38-45.

(Continued)

*Primary Examiner* — Kambiz Zand
*Assistant Examiner* — Ayoub Alata
(74) *Attorney, Agent, or Firm* — Timothy Churna; Kate Drakos; Micky Minhas

(57) ABSTRACT

A privacy-preserving identity system is described herein that combines low disclosure tokens with an identity metasystem to allow proof of a user's identity and other claims about the user in a manner that preserves the user's privacy by avoiding disclosing unnecessary information about the user. A low or minimal disclosure token is a security token that encodes claims in such a way that (1) the token can be long-lived, (2) the token can be presented in an unlinkable manner, or (3) the user can minimally disclose the encoded information to respond to an unanticipated Relying Party policy. Using the privacy preserving system within an identity metasystem, users can obtain long-lived, low disclosure tokens from the Identity Provider and later present them to Relying Parties; thus improving both users' privacy and the system's scalability.

20 Claims, 4 Drawing Sheets

(56) References Cited

OTHER PUBLICATIONS

Jones, Michael.B., "A Guide to Supporting Information Cards within Web Applications and Browsers as of the Information Card Profile V1.0", Retrieved at <<http://citeseerx.ist.psu.edu/viewdoc/download?doi=10.1.1.69.9021&rep=rep1&type=pdf>> Dec. 2006, Version 1, pp. 1-13.

"Security in a Web Services World: A Proposed Architecture and Roadmap", Retrieved at <<http://download.boulder.ibm.com/ibmdl/pub/software/dw/library/ws-secmap.pdf>> Apr. 7, 2002, pp. 20.

"Microsoft's Vision for an Identity Metasystem", Retrieved at <<http://research.microsoft.com/en-us/um/people/mbj/papers/identitymetasystem.pdf>> May 2005, pp. 10.

* cited by examiner

PRESERVING PRIVACY WITH DIGITAL IDENTITIES

BACKGROUND

Identity is well understood in the physical world, but is a current challenge in the digital world. In the physical world, people present a passport at an airport's Immigration Desk, a driver's license to a police officer, a credit card to pay for a best-selling novel at a bookstore, and various other types of identification in a variety of situations. In the digital world, people may log onto websites using a username and password, provide shipping and credit card information to an online retailer, use a smartcard to log onto a corporate network, and so forth.

Numerous systems exist for providing digital identity. The identity metasystem provides a framework for organizing many different types of systems for digital identities. WINDOWS™ CardSpace uses various vendor-neutral communication standards, such as WS-Security, WS-Trust, WS-MetadataExchange, and WS-SecurityPolicy to offer a consistent way to work with any digital identity created by any source, using any identity technology. WINDOWS™ CardSpace lets any MICROSOFT™ WINDOWS™ application provide users a common way to work with digital identities.

Despite their diversity, digital identities all have one thing in common: when transmitted on the network, every digital identity is represented by some kind of security token. A security token is just a set of bytes that expresses information about a digital identity. This information includes one or more claims asserted to be true by the token's issuer, each of which contains some part of the total information conveyed about this identity. A simple security token might include only a claim containing a username, while a more complex one might include claims containing a user's first name, last name, home address, and more. Security tokens for some digital identities might also include claims that contain sensitive information such as credit card numbers.

With most security systems, some information is provided in order to prove that these claims really do belong to the user presenting them. One simple (and currently very common) way to do this is to send a password along with the claims. A more powerful approach is for the user to prove claims ownership using a private key associated with a public key that has been signed along with the disclosed claims by the issuer. Regardless of the method, the security tokens that represent digital identities commonly provide some kind of proof that allows a receiver of the token to verify that this token really does represent the person or organization presenting the token.

In the identity metasystem, users present certified claims to a Relying Party by retrieving a security token encoding the requested claims from the Identity Provider in real time. For example, the user may attempt to access a web page provided by the Relying Party, receive a request for identity verification, contact the Identity Provider to obtain a security token, and provide the security token to the Relying Party to access the web page. This approach creates privacy, security, and scalability problems. For example, the Identity Provider can track and trace the user's activities (especially if colluding with Relying Parties), can deny access to targeted users or impersonate them, and has to be highly reliable because it is involved in each user access. In addition, the Relying Party may receive more information about the user through the security token than is necessary for the user's purpose in interacting with the Relying Party.

SUMMARY

A privacy-preserving identity system is described herein that combines low disclosure tokens with an identity metasystem to allow proof of a user's identity and other claims about the user in a manner that preserves the user's privacy by avoiding disclosing unnecessary information about the user. A low or minimal disclosure token is a security token that encodes claims in such a way that (1) the token can be long-lived, (2) the token can be presented in an unlinkable manner, or (3) the user can minimally disclose the encoded information to respond to an unanticipated Relying Party policy. Using the privacy preserving system within an identity metasystem, users can obtain long-lived, low disclosure tokens from the Identity Provider and later present them to Relying Parties; thus improving both users' privacy and the system's scalability. Thus, the privacy-preserving identity system allows a user to access information without connectivity to the Identity Provider, without allowing correlation of a user's steps, and without disclosing excess information about the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
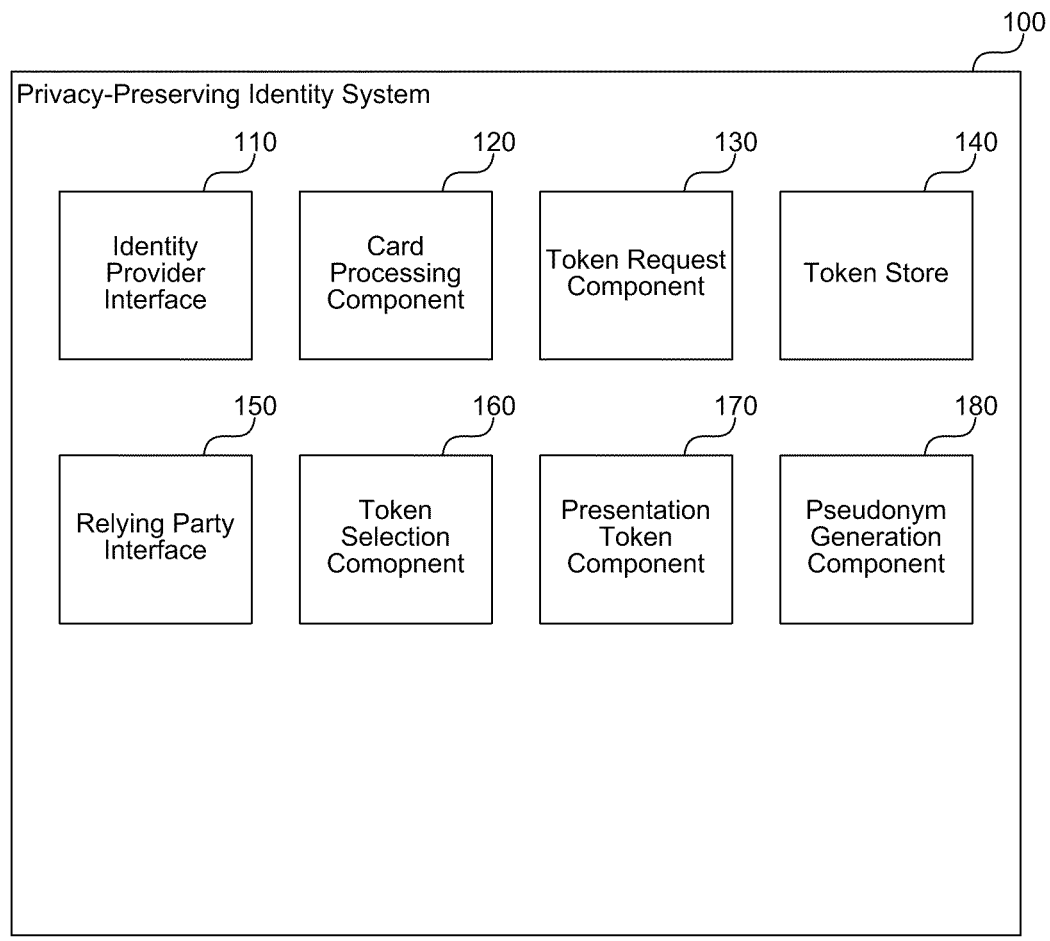
FIG. 1 is a block diagram that illustrates components of the privacy-preserving identity system, in one embodiment.

A privacy-preserving identity system is described herein that combines low disclosure tokens with an identity metasystem to allow proof of a user's identity and other claims about the user in a manner that preserves the user's privacy by avoiding disclosing unnecessary information about the user. A low or minimal disclosure token is a security token that encodes claims (or attributes) in such a way that (1) the token can be long-lived (i.e., valid until an issuer-specified expiration), (2) the token can be presented in an unlinkable manner (i.e., the issuer and verifier cannot infer more about the user than the disclosed information), or (3) the user can minimally disclose the encoded information to respond to an unanticipated Relying Party policy (e.g., disclose the subset of the encoded claims, disclose a derived claim (e.g., prove over-21 claim from a date of birth), prove that an encoded identifier is not on a control list without disclosing the identifier, etc.). Using the privacy preserving system within an identity metasystem, users can obtain long-lived, low disclosure tokens from the Identity Provider and later present them to Relying Parties; thus improving users' privacy (even in the face of active collusion between the Identity Provider and Relying Parties) and the system's scalability (no need to connect to the Identity Provider when accessing the Relying Party). Thus, the privacy-preserving identity system allows a user to access information without connectivity to the Identity Provider, without allowing correlation of the user's steps, and without disclosing excess information about the user.

The following description describes the privacy-preserving identity system using an information card model in which the user's client is called an Identity Selector. The same techniques are possible when information cards are not used. Minimal disclosure tokens suitable for use with the system described herein have been well described in the art (see, e.g., MICROSOFT™ U-PROVE™ technology), which description is not repeated herein except where useful to elaborate on integration with an identity metasystem.

The user is provisioned with an information card by the Identity Provider. The Identity Selector, upon detecting that the card supports a type of low disclosure token, requests one or more low disclosure tokens from the Identity Provider (some types of tokens offer multi-show unlinkability; in such a case, only one token might be needed). The Identity Selector securely stores the retrieved tokens in association with the information card (they can be encrypted using the credential used to authenticate to the Identity Provider (e.g., a PKI certificate); on the user's system or on a separate device (e.g., a smartcard)).

When the user chooses to present the information card to a Relying Party (i.e., to satisfy the Relying Party's authentication or authorization policies), the Identity Selector picks an available low disclosure token and uses it to present only those claims requested by the Relying Party (either disclosing them directly or proving derived claims). This process involves using the token's private key with a unique challenge to provide security. If no tokens are available, fresh ones are obtained from the Identity Provider. It may be advantageous to obtain tokens in advance, as the time separation between token issuance and presentation improves the user's privacy (even in the face of active collusion between the Identity Provider and Relying Parties) and the system's scalability (no need to connect to the Identity Provider in real time).

When tokens support unlinkability, a secure and privacy-preserving pseudonym (such as the private personal identifier (PPID) claim defined in the OASIS Identity Metasystem Interoperability V1.0 specification) can be derived from a presented token using a one-way transformation (such as a secure hash function). Since the resulting pseudonym is derived from data known only to the user, it is unknown to the Identity Provider and cannot be presented by any party other than the user. This pseudonym generation technique improves the system's security because insiders at the Identity Provider cannot issue themselves tokens from which a matching pseudonym value can be derived to maliciously authenticate as the user. When a pseudonym value is presented to a Relying Party, the issued token used to create the corresponding presented token is saved and associated with the Relying Party by the Identity Selector. Otherwise, if a pseudonym value is not presented, the presented token is deleted to preserve unlinkability between uses of the information card (if the low disclosure token type supports multi-show unlinkability, there is no need to delete the token). Since pseudonym values should be valid for the duration of a user's relationship with an Identity Provider, the Identity Provider can issue low disclosure tokens encoding no claims used only for the purpose of deriving pseudonym values; these tokens can be kept for a long time even if the user's other claim values change over time. To enhance user privacy, low disclosure tokens may be obtained from the Identity Provider at random intervals to break the timing correlation between token issuance and presentation. This technique also serves to improve the system's scalability by distributing the token issuance workload on Identity Providers.

To enhance security, the Identity Provider can issue tokens that can be revoked. Hereto, it encodes a unique user identifier in all issued tokens. To preserve the user's privacy, the identifier is not disclosed to Relying Parties. However, at each presentation, the user would need to prove that the encoded identifier is not present in a revocation list distributed by the Identity Provider. This provides the same security as a PKI Certificate Revocation List (CRL), but without requiring the user to authenticate (thus providing more privacy).

FIG. 1 is a block diagram that illustrates components of the privacy-preserving identity system, in one embodiment. The system 100 includes an identity provider interface 110, a card processing component 120, a token request component 130, a token store 140, a relying party interface 150, a token selection component 160, a presentation token component 170, and a pseudonym generation component 180. Each of these components is described in further detail herein.

The identity provider interface 110 provides an interface between an Identity Provider and an Identity Selector. The Identity Provider may include a server, such as a web-based service, that is trusted to provide authentication information about users to one or more Relying Parties. The identity provider interface 110 may include a variety of types of connections, such as a connection from a client to the server over the Internet, a LAN, a mobile network, and so forth.

The card processing component 120 processes an information card from the Identity Provider that is associated with at least one digital identity of a user. An information card may include information about the types of tokens that the Identity Provider can issue for the user, including low disclosure tokens that assert various claims about the user. Claims may include a name, email address, date of birth, state of residence, and any other type of information about the user. The card processing component 120 may perform its duties any time the system may submit a token request (e.g., when an information card received from an identity provider is imported into the system, when a user selects an identity to present to a relying party, or any other time following the import of an information card).

The token request component 130 requests one or more low disclosure tokens from an Identity Provider that indicates support for low disclosure tokens in an information card it issues. An Identity Provider may support many different types of tokens as well as certificates and other cryptographic identity systems. The token request component 130 requests low disclosure tokens to store at or to otherwise be used by a particular Identity Selector. The token request component 130 may request many different tokens at a time, so that the Identity Selector can use separate tokens for various purposes (e.g., accessing different web sites), and so that the Identity Selector does not have to return to the Identity Provider each time the Identity Selector wants to use a low disclosure token. For example, the token request component 130 may request a batch of 100 low disclosure tokens from the Identity Provider at a time. Likewise, the token request component 130 can process a response from an Identity Provider that contains a batch of low disclosure tokens even when no specific number of tokens was requested.

The token store 140 stores tokens at an Identity Selector retrieved from an Identity Provider. The token store 140 may include one or more files, a database, a cloud-based storage service, and any other type of storage accessible by the Identity Selector. The token store 140 may encrypt stored tokens using a key associated with the Identity Selector or user to prevent unauthorized access of stored tokens. The token store 140 may also store tokens and other metadata used to present a pseudonym after they have been presented at least once to a Relying Party so that the Identity Selector can present the same pseudonym to the same Relying Party in the future.

The relying party interface 150 provides an interface between an Identity Selector and a Relying Party. Relying Parties request claims from an Identity Selector, which an Identity Selector provides as one or more presentation tokens derived from information issued by an Identity Provider. The Relying Party verifies presentation tokens provided by an Identity Selector using information obtained (directly or indirectly, in advance or on demand) from the Identity Provider. The relying party interface 150 may include a network connection, such as the Internet. A web browser or other program associated with an Identity Selector may access content, such as a web page, provided by the Relying Party, and the Relying Party may issue a challenge or other authentication request that asks the Identity Selector to present the user's identity or other information about the user (e.g., residence state, age, and so on).

The token selection component 160 selects one or more tokens issued by the Identity Provider to provide to a Relying Party in response to a request by the Relying Party for claims. For example, a Relying Party that sells wine over the Internet may request that a user present a claim that the user is over 21 or other legal age for purchasing alcoholic beverages. The Relying Party may also request other information, such as the user's state of residence, which may affect the user's ability to legally complete the purchase. The token selection component 160 selects tokens from any of: those issued by the Identity Provider that have not previously been presented to any Relying Party; those that have previously been presented to this Relying Party (such as in the case when a pseudonym is requested and it is desirable to continue using the same pseudonym in interactions with the Relying Party); or those that have previously been presented to any Relying Party (such as in the case of a token type supporting multi-show unlinkability).

The presentation token component 170 uses the selected token(s) issued by the Identity Provider to create a low disclosure presentation token suitable for presentation to the Relying Party. The presentation token discloses only those claims about the user that are needed by the Relying Party to satisfy the user's interaction with the Relying Party. The presentation token can include derived information based on the issued token(s), such as a claim that the user's date of birth is prior to a specific date, without disclosing the full information from which the claim is derived. For example, a user purchasing wine in the previous example may wish to prove that the user is over 21 but may not wish to have the Relying Party know the user's exact date of birth, full name, and so forth. The presentation token can also include negative assertions, such as asserting that the token has not expired, or that the user or an identifier associated with the user is not on a revocation list.

The pseudonym generation component 180 generates claims that identify a user with a specific identifier. Since the actual pseudonym could be computed by either the selector or the relying party depending on the type of token, the pseudonym component 180 can reside at either the selector or with the relying party. It is often desirable to identify a user by the same identity with each access of a Relying Party (e.g., to access email at a web-based email provider), but not for the Relying Party and the Identity Provider to be able to correlate the user's identity. In addition, it is often desirable to prevent an errant Identity Provider from impersonating the user. Pseudonyms can serve this purpose by being derived from information verified by the Identity Provider and with information provided by the Identity Selector that is unknown to the Identity Provider. This allows the creation of a pseudonym for the user that is the same with each access to the Relying Party, but is not directly traceable to the user, even with collusion between the Relying Party and Identity Provider. The pseudonym may be generated by the Identity Selector and included as a separate claim in a token or may be derived by the Relying Party from a presented token, possibly one encoding no other claims. When a pseudonym is used in association with a presentation token to access a Relying Party, the system stores the corresponding issued token in the token store 140 for future use with the same Relying Party.

The computing device on which the privacy-preserving identity system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
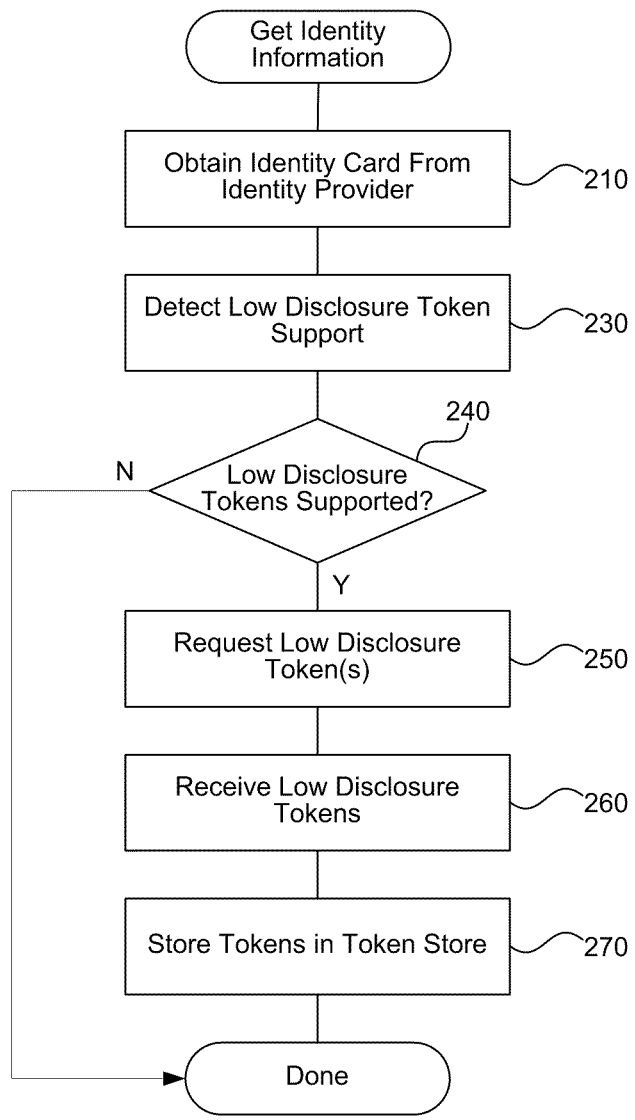
FIG. 2 is a flow diagram that illustrates processing of the privacy-preserving identity system to get identity information for a user from an Identity Provider, in one embodiment.

FIG. 2 is a flow diagram that illustrates processing of the privacy-preserving identity system to get identity information for a user from an Identity Provider, in one embodiment. An Identity Selector retrieves identity metadata (e.g., such as contained in an information card) and corresponding low disclosure token(s) from the Identity Provider as described in the following steps. Beginning in block 210, the system obtains an information card associated with a user from an Identity Provider. For example, an Identity Selector (e.g., a client computer) associated with a user may send a request to an Internet-based identity provider to receive an information card containing metadata about the identity information that the provider is willing to issue about the user. The metadata may include one or more token types available from the Identity Provider. For example, the Identity Provider may provide an XML-based response that includes a list of token types that the Identity Provider supports, such as low disclosure tokens. The Identity Provider may provide many different types of tokens and identity information for various purposes.

The following blocks may include optional steps or steps that although shown serially, may occur at various times during the interaction between identity providers, identity selectors, and relying parties. Continuing in block 230, the system detects whether the Identity Provider supports low disclosure tokens based on the received identity information. For example, the identity information may specify a low disclosure token type. Continuing in decision block 240, if the Identity Provider supports low disclosure tokens, then the system continues at block 250, else the system completes. Continuing in block 250, the system requests one or more low disclosure tokens from the Identity Provider. The system may request multiple low disclosure tokens from the Identity Provider in a batch to avoid returning to the Identity Provider at each instance of accessing a Relying Party. The system may also request a token that supports multi-show unlinkability so that a single low disclosure token can be used by the Identity Selector for many later requests from Relying Parties.

Continuing in block 260, the system receives one or more low disclosure tokens from the Identity Provider in response to the request. For example, the Identity Provider may provide an XML-based response (e.g., WS-Trust13) that includes metadata and information related to one or more tokens requested by the Identity Selector. Continuing in block 270, the system stores the received tokens in a token store associated with the user for later presentation to a Relying Party. For example, the system may store tokens in an encrypted token store at the Identity Selector that can be accessed for later requests from the Relying Party. After block 270, these steps conclude.

Figure 3:
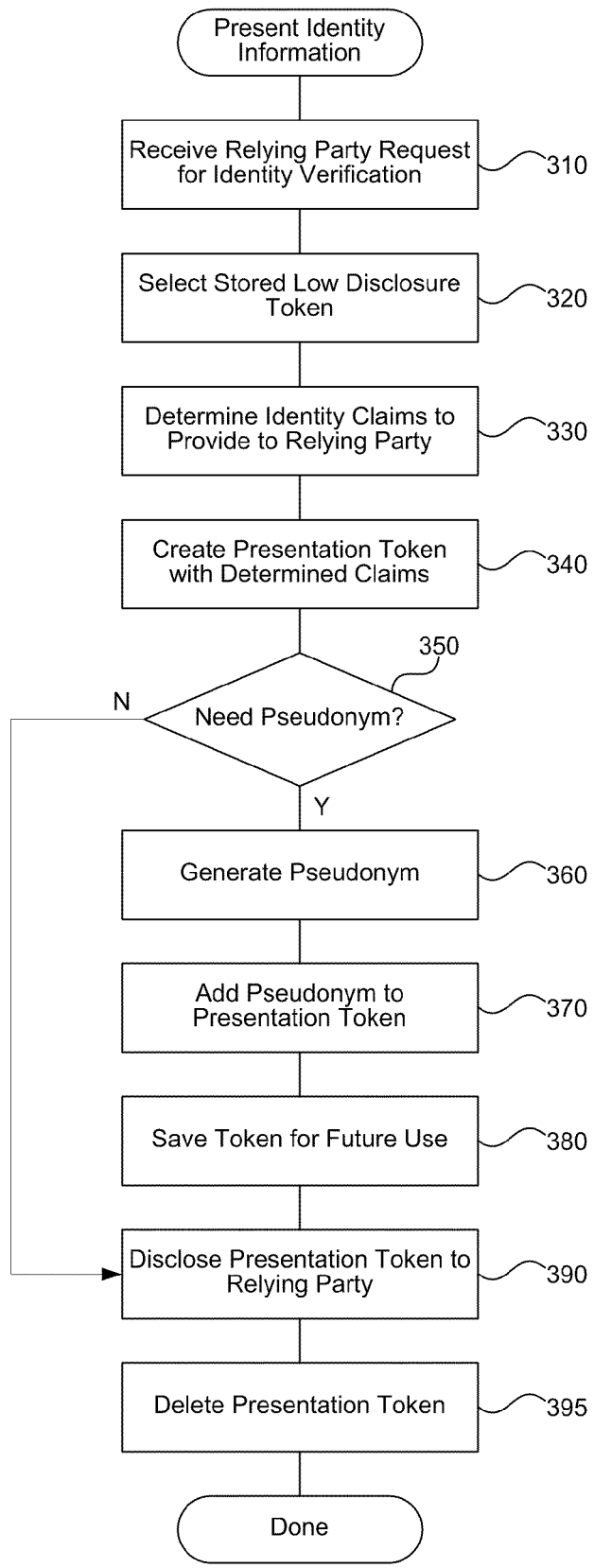
FIG. 3 is a flow diagram that illustrates processing of the privacy-preserving identity system to verify a user's identity to a Relying Party, in one embodiment.

FIG. 3 is a flow diagram that illustrates processing of the privacy-preserving identity system to present a user's identity to a Relying Party, in one embodiment. Sometime after obtaining the information card from the Identity Provider, a user interacts with a Relying Party that requests information about the user. In response, the Identity Selector presents one or more low disclosure tokens disclosing only the information requested by the Relying Party. Beginning in block 310, the system processes a relying party policy to verify information about a user. Typically, the user will initiate a request to the Relying Party (e.g., to access content on a website), and the relying party makes available a policy specifying the access requirements, possibly containing an access challenge. The received policy may specify one or more types of information about the user that the Relying Party wants to verify, such as the user's age, email address, and so forth.

Continuing in block 320, the system selects a previously stored low disclosure token with which to respond to the received policy. For example, the system may have previously received a batch of low disclosure tokens from an Identity Provider (see, e.g., FIG. 2); if not, tokens could be requested at this point. The system may select a token based on a set of claims encoded by the token. Continuing in block 330, the system determines one or more identity claims to provide to the Relying Party in response to the received policy. For example, the system may use a token type that allows presenting only a required subset of the encoded claims without altering the validity of the token or the verification of identity provided by the Identity Provider. Continuing in block 340, the system creates a presentation token by using the selected token(s) to include the determined one or more identity claims. For example, the system may omit claims that are not determined to be relevant for the current interaction with the Relying Party, such as the user's state of residence or address.

Continuing in decision block 350, if the system determines that the Relying Party policy indicates a request to uniquely identify the user, then the system continues at block 360, else the system jumps to block 390. Continuing in block 360, the system selects a token from which a pseudonym will be derived. A pseudonym allows the user to identify himself to a Relying Party without revealing his actual identity. Continuing in block 370, the system includes the pseudonym with the presentation token. In some cases, the system may do so by providing a separate low disclosure token in the presentation token. Alternatively or additionally, the system may add the pseudonym value as an identity claim along with other identity claims in the presentation token. Continuing in block 380, the system stores the presented token(s) for future use with the same Relying Party. For example, the system may place the token(s) in a token store that persists tokens and contains a mapping between Relying Parties and persistent tokens. The system may store other related information, such as the issued token corresponding to any other claims that are present in the presentation token.

Continuing in block 390, the system transmits the presentation token to the Relying Party in response to the Relying Party's policy. For example, the system may send the token over a network to the Relying Party. The Relying Party generally then verifies the token information using information obtained (directly or indirectly, in advance or on demand) from the Identity Provider to verify the validity of the information provided by the Identity Selector. Continuing in block 395, the system deletes the issued token(s) with which the presentation token was created to prevent correlation of the user's activities with multiple Relying Parties (i.e., if the issued token(s) do not support multi-show unlinkability). If the presentation token included a pseudonym as described with reference to blocks 360-380, then the saved copy of the issued token(s) are preserved for future access to the same Relying Party. After block 395, these steps conclude.

Figure 4:
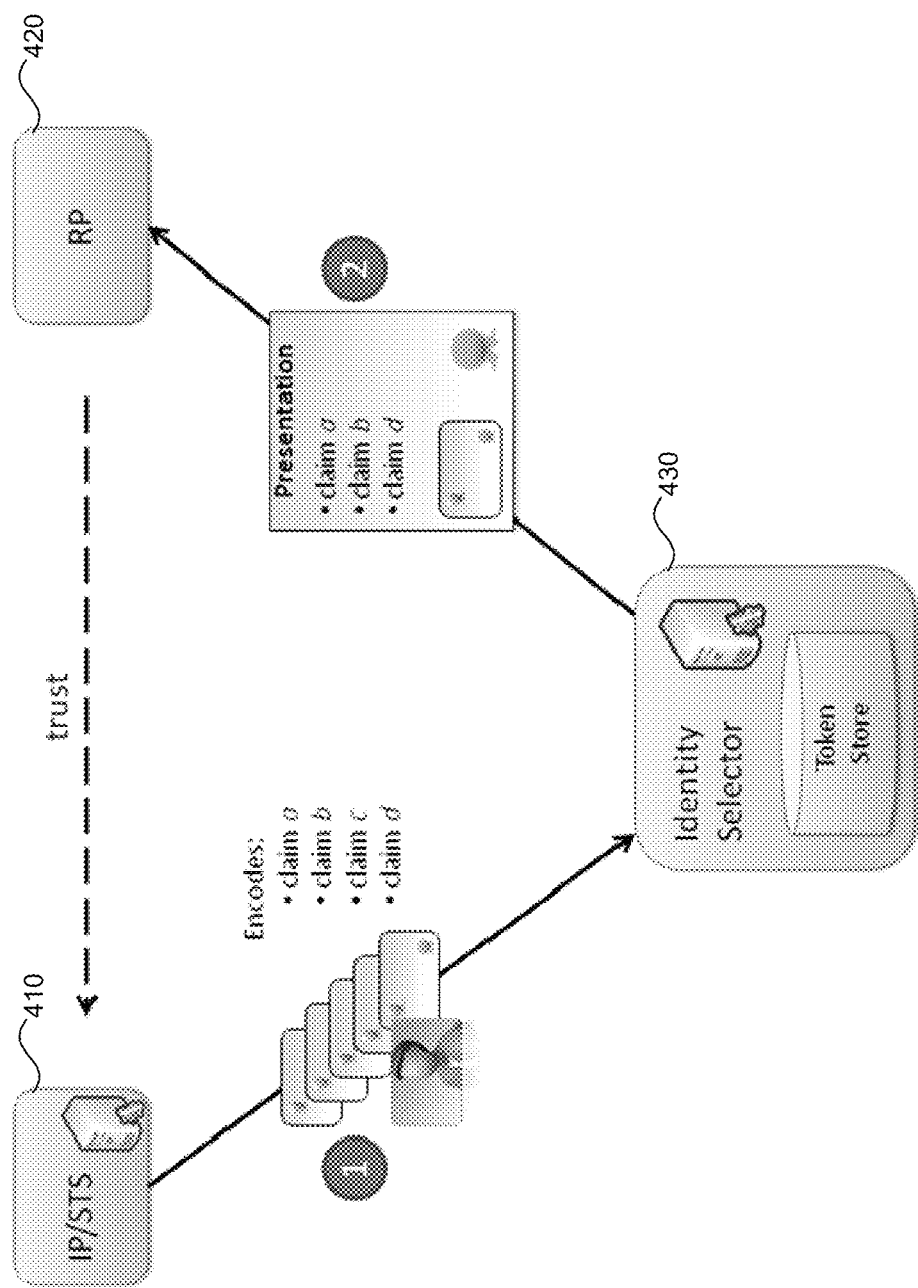
FIG. 4 is a block diagram that illustrates an operating environment of the privacy-preserving identity system, in one embodiment.

FIG. 4 is a block diagram that illustrates an operating environment of the privacy-preserving identity system, in one embodiment. An Identity Provider 410 encodes identity claims in one or more tokens issued to an Identity Selector 430. The Identity Provider 410 may first issue an information card or other identity metadata to the Identity Selector 430. The Identity Selector 430 includes a token store where issued tokens are stored until needed to disclose claims to a Relying Party 420. The Identity Selector 430 provides a presentation token created using one or more issued tokens proving a reduced set of claims to the Relying Party 420. The Identity Selector 430 can include a subset of the identity claims in an issued token when creating a presentation token that preserves a user's privacy by limiting disclosure of user information to the Relying Party 420. The Relying Party 420 verifies the information in the presentation token using information obtained (directly or indirectly, in advance or on demand) from the Identity Provider 410.

In some embodiments, the privacy-preserving identity system works with various types of low disclosure tokens. Several types of low disclosure tokens exist, including U-Prove tokens, IBM's Idemix tokens, PKI certificates with encrypted attributes, blind signature-based tokens, etc. The system is not limited to any particular type of low disclosure token that can be used in an identity metasystem to produce the low disclosure proof of identity described herein. The system may determine a token type to provide based on a token type expected or requested by a particular Relying Party. Since one purpose of the identity metasystem is to unify the method of communicating identity information while remaining flexible as to the way identity information is authenticated and packaged, the system can operate with multiple token types.

In some embodiments, the privacy-preserving identity system supports revocation of issued tokens by an Identity Provider. Because tokens used with the system can be long-lived (e.g., the Identity Selector may request tokens well in advance of presenting the tokens to a Relying Party), the Identity Provider may determine that a user or Identity Selector no longer has particular rights or authorities after tokens have already been issued. A Relying Party can challenge an Identity Selector to verify that a particular token is not associated with revoked rights using the low disclosure tokens described herein.

In some embodiments, the privacy-preserving identity system uses multi-show unlinkable tokens. A multi-show unlinkable token is a type of low disclosure token that supports multiple uses with separate Relying Parties without allowing the Relying Parties to correlate the user's steps between them. With a multi-show unlinkable token type, the system can avoid requesting large batches of tokens from the Identity Provider and may not delete tokens upon each use of the token with a Relying Party, since the token can be reused without reducing the user's privacy.

From the foregoing, it will be appreciated that specific embodiments of the privacy-preserving identity system have been described herein for purposes of illustration, but that various modifications may be made without deviating from the spirit and scope of the invention. Accordingly, the invention is not limited except as by the appended claims.

We claim:

1. A computer-implemented method for presenting information about a user while preserving privacy, the method comprising:

processing a relying party policy to obtain information about the user;

detecting an information card associated with the user;

determining that the information card associated with the user supports one or more low disclosure tokens;

requesting from an identity provider one or more low disclosure tokens selecting one or more low disclosure tokens issued by the identity provider with which to respond to the policy from a token store wherein the token store securely stores by encrypting the one or more low disclosure low disclosure tokens on a system associated with the user with a credential used to authenticate to the identity provider;

determining one or more identity claims to provide to the relying party in response to the policy from the selected one or more low disclosure tokens;

creating a presentation token that includes the determined one or more identity claims, the presentation token including a subset of at least one of the one or more identity claims of the one or more low disclosure tokens, wherein at least one of the one or more low disclosure tokens includes only a minimal set of information required by the relying party;

disclosing the created presentation token to the relying party in response to the received policy; and deleting the selected low disclosure tokens to prevent correlation of the user's activities with multiple relying parties, wherein the preceding steps are performed by at least one processor.

2. The method of claim 1 wherein selecting a low disclosure token comprises selecting from a batch of tokens requested from an identity provider.

3. The method of claim 1 wherein selecting a low disclosure token comprises selecting a token based on a set of identity claims encoded by the token.

4. The method of claim 1 wherein selecting a low disclosure token comprises selecting a token based on whether the presentation token will include a pseudonym, and upon so determining, selecting a token that has previously been disclosed to the relying party.

5. The method of claim 1 further comprising, before disclosing the presentation token, determining whether the presentation token will include a pseudonym, and upon so determining, generating a pseudonym that includes information identifying the user derived from combining information provided by the identity provider and information not known by either the identity provider or the relying party.

6. The method of claim 5 further comprising, saving the low disclosure tokens and generated pseudonym for a future interaction with the relying party.

7. A computer system for preserving privacy of online digital identity, the system comprising:

a processor and memory configured to execute software instructions;

an identity provider interface configured to provide an interface between an identity provider and an identity selector;

a card processing component configured to process an information card from the identity provider that is associated with at least one digital identity of a user, wherein the information card is configured to support one or more low disclosure tokens;

a token request component configured to request one or more low disclosure tokens from the identity provider, when the identity selector detects that information card is configured to support one or more low disclosure tokens;

a token store configured to store one or more tokens at the identity selector retrieved from the identity provider for later presentment to a relying party, wherein the token store securely stores the one or more retrieved tokens on a system associated with the user by encrypting using a credential used to authenticate to the identity provider;

a relying party interface configured to provide an interface between the identity selector and the relying party;

a token selection component configured to select one or more tokens issued by the identity provider from the token store to provide to the relying party in response to a request by the relying party to determine information about the user; and a presentation token component configured to convert the selected tokens issued by the identity provider into a low disclosure presentation token suitable for presentation to the relying party while preserving the user's privacy.

8. The system of claim 7 wherein the card processing component is further configured to change its behavior based on the token types that the identity provider can issue for the user.

9. The system of claim 7 wherein the token request component is further configured to request multiple tokens at a time, so that the identity selector can use separate tokens for interacting with multiple relying parties.

10. The system of claim 7 wherein the token request component is capable of receiving any number of tokens at a time regardless of how many tokens were requested, so that the token issuer can choose to issue one or many tokens.

11. The system of claim 7 wherein the token store is further configured to store one or more tokens associated with a pseudonym after the tokens have been presented at least once to a relying party so that the identity selector can use the tokens again for future presentation to the same relying party.

12. The system of claim 7 wherein the presentation token component is further configured to present the minimal set of information derived from the information encoded in the issued token required by a relying party in a specific unanticipated transaction.

13. The system of claim 7 wherein the presentation token component is further configured to include a subset of the identity information encoded into the selected tokens as one or more identity claims about the user.

14. The system of claim 7 wherein the presentation token component is further configured to include one or more negative assertions that proves that a query of the relying party is not true for the user.

15. The system of claim 7 wherein the presentation token component is further configured to include one or more identity claims about the user that are derived from the identity information encoded into the selected tokens.

16. The system of claim 7 further comprising a pseudonym generation component configured to generate identity claims that identify a user with a specific identifier that is not directly traceable to the user, even with collusion between the relying party and identity provider.

17. A computer-readable storage device comprising instructions for controlling a computer system to generating privacy preserving tokens, wherein the instructions, when executed, cause a processor to perform actions comprising:
   obtaining an information card associated with a user from an identity provider, wherein the information card indicates whether the identity provider can provide low disclosure tokens and the information card supports low disclosure tokens;
   detecting whether the identity provider supports low disclosure tokens based on the obtained information card; and
   upon determining that the identity provider and the information card supports low disclosure tokens,
      requesting one or more low disclosure tokens from the identity provider;
      receiving one or more low disclosure tokens from the identity provider in response to the request;
      storing the received tokens in an encrypted token store on a system associated with the user for later presentation to a relying party, wherein the encrypted token store is further associated with an identity selector and wherein the encrypted token is encrypted using the a credential used to authenticate to the identity provider; and
   presenting to a relying party the low disclosure token in response to a request from the relying party for the identity token, wherein the low disclosure token contains only a minimal set of information required by the relying party in an unanticipated transaction.

18. The device of claim 17 wherein requesting one or more low disclosure tokens comprises requesting a batch of multiple tokens from the identity provider to avoid returning to the identity provider for tokens upon each instance of interacting with a relying party.

19. The device of claim 17 wherein requesting low disclosure tokens comprises not requesting any particular number of tokens from the identity provider, but receiving a batch of any number of tokens.

20. The device of claim 17 wherein requesting one or more low disclosure tokens comprises requesting a multi-show unlinkable low disclosure token from the identity provider.

* * * * *